United States Patent [19]

BEST AVAILABLE COPY

Neuner et al.

[11] 3,895,223

[45] July 15, 1975

[54] CIRCUIT ARRANGEMENT FOR ENHANCING THE RELIABILITY OF COMMON BUS OUTPUTS OF PLURAL REDUNDANT SYSTEMS

[75] Inventors: James A. Neuner, Gibsonia, Pa.; Maurizio Traversi, Turin, Italy

[73] Assignee: Westinghouse Electric Corporation, Pittsburgh, Pa.

[22] Filed: Jan. 3, 1973

[21] Appl. No.: 320,775

[52] U.S. Cl. .................. 235/153 AE; 340/146.1 BE

[51] Int. Cl. ........................ G06f 11/00; G06f 15/16

[58] Field of Search ............... 235/153 AE, 153 AH; 340/146.1 BE; 307/204, 219

[56] References Cited

UNITED STATES PATENTS

| | | | |
|---|---|---|---|
| 3,496,836 | 2/1970 | Jenney | 340/146.1 BE |
| 3,544,778 | 12/1970 | Masters, Jr. | 235/153 AH |
| 3,593,307 | 7/1971 | Gouge, Jr. | 235/153 AE |
| 3,667,057 | 5/1972 | Pfersch, Jr. et al. | 307/219 |
| 3,681,578 | 8/1972 | Stevens | 235/153 AE |
| 3,686,493 | 8/1972 | Schmid | 307/219 |
| 3,689,802 | 9/1972 | Waldmann | 340/146.1 BE |

*Primary Examiner*—Charles E. Atkinson
*Attorney, Agent, or Firm*—D. C. Abeles

[57] ABSTRACT

A circuit arrangement for enhancing the reliability of common bus outputs in redundant systems generating a plurality of at least three substantially similar outputs to a common bus signal train. Each output is separately compared to the other corresponding outputs and if a difference is determined, the output exhibiting the difference is disconnected from the common bus. Provision is made for a separate alarm identifying the output exhibiting the difference. In one embodiment, a second level majority vote takes place at the termination of the common bus by comparing the weighted sum voltage of the corresponding outputs applied to the common bus against a threshold voltage. Additionally, the applicability of this invention to enhance the reliability of digital position indication systems utilizing independent signal trains is specifically described. Varying degrees of redundancy are taught in the alternate embodiments to accommodate the standard of reliability desired.

8 Claims, 8 Drawing Figures

CIRCUIT ARRANGEMENT FOR ENHANCING THE RELIABILITY OF COMMON BUS OUTPUTS OF PLURAL REDUNDANT SYSTEMS

CROSS-REFERENCE TO RELATED APPLICATIONS

The present invention is related to the invention covered by copending U.S. patent applications Ser. No. 320,776, entitled "Position Indication System" by F. T. Thompson, Frederick J. Young and D. J. Boomgaard; and Ser. No. 320,792, entitled "Digital Multiplexed Position Indication and Transmission System" by J. A. Neuner, F. T. Thompson and L. Vercellotti. All of the aforementioned U.S. patent applications are assigned to the assignee of the present invention and are filed concurrently herewith.

BACKGROUND OF THE INVENTION

This invention pertains in general to redundant systems generating a plurality of substantially similar outputs to a common bus signal train and more particularly to such systems that require a high degree of reliability through common portions of the system shared by the plurality of outputs.

In many systems utilizing a plurality of signal trains communicating substantially similar signals, mostly for redundancy, the advantage obtained is often lost in common segments of the system at the termination of the signal trains. Adding further redundancy to the common segments of the system usually degrades the maintainability of the system as well as increases the probability of single component failure.

An exemplary system requiring redundancy to enhance system reliability is the digital multiplexed rod position indication system for nuclear reactors described in copending application Ser. No. 320,776, entitled "Position Indication System" cited above. In this digital rod position indication system, redundancy is provided within the detectors, containment electronics and display area. However, a central control unit is employed to coordinate the operation of all other areas of the system, and therefore remains the common element between otherwise redundant areas. Consequently, it represents the only weak link left in the system, the overall reliability of which is primarily limited by the reliability of the central control unit itself. Failure of the central control unit will probably cause a complete loss of position indication on all control rods.

Addition of a second central control unit to replace the first provides little improvement since a disagreement between the two units would prove only that one had failed but would give no indication as to which one. Due to the complexity of its functions, failure detection within each central control unit could not be reliably implemented as in the rest of the system.

Accordingly, an alternate form of redundancy is desired which will enhance the system's reliability without degrading its maintainability.

SUMMARY OF THE INVENTION

Briefly, this invention provides a circuit arrangement for enhancing the reliability of common bus outputs in redundant systems generating a plurality of at least three substantially similar outputs to a common bus signal train. The plurality of outputs are compared to determine the existence of a corresponding difference in signal levels. An inconsistency in corresponding signal levels is indicative of a fault in the portion of the system exhibiting the difference. If a difference is detected, the output exhibiting the difference is disconnected from the common bus, while the remaining outputs are communicated thereto.

In one embodiment, where more than one output exhibits a difference, the inconsistent outputs are disconnected from the common bus in a predetermined order of priority. Where desired, the last output within the ordered priority can be prevented from disconnecting from the common bus.

In a modified embodiment, provision is made for a second level majority vote at the termination of the common bus. Each level of majority vote can be implemented in a redundant manner to enhance reliability without degrading systems maintainability.

An alarm provision can be included, as described, to identify the existence of a malfunctioning output as well as its location.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

In most redundant systems the advantage obtained from redundancy is often lost in common segments of the system. This invention provides a circuit arrangement for assuring the validity and enhancing the reliability of the information processed through common portions of otherwise redundant systems. While the system contemplated by this invention will be described in conjunction with a control rod position indication system for nuclear reactors, it should be understood that this invention has analogous applicability to most redundant electrical systems employing common portions.

To provide reliable and accurate nuclear control rod position information, even under single failure conditions, for each rod, the detector coils and the associated containment electronics employed within the position indication system contemplated by this invention (more fully described in copending application Ser. No. 320,792, cited above) are divided into two separate identical groups. Each group is capable of providing redundant information on the true position of each control rod with one-half the desired resolution. Two sets of digital data are transmitted through independent time division multiplexed channels to the reactor control room where independent error checking is performed. The two sets of verified data are sent to a central control unit and combined to determine the true position of each of the control rods with the required full resolution desired.

If a failure occurs in either group, it will be automatically detected resulting in the rejection of the corresponding data so that the true rod position, determined by the remaining group, will still be displayed with reduced resolution.

Figure 1:
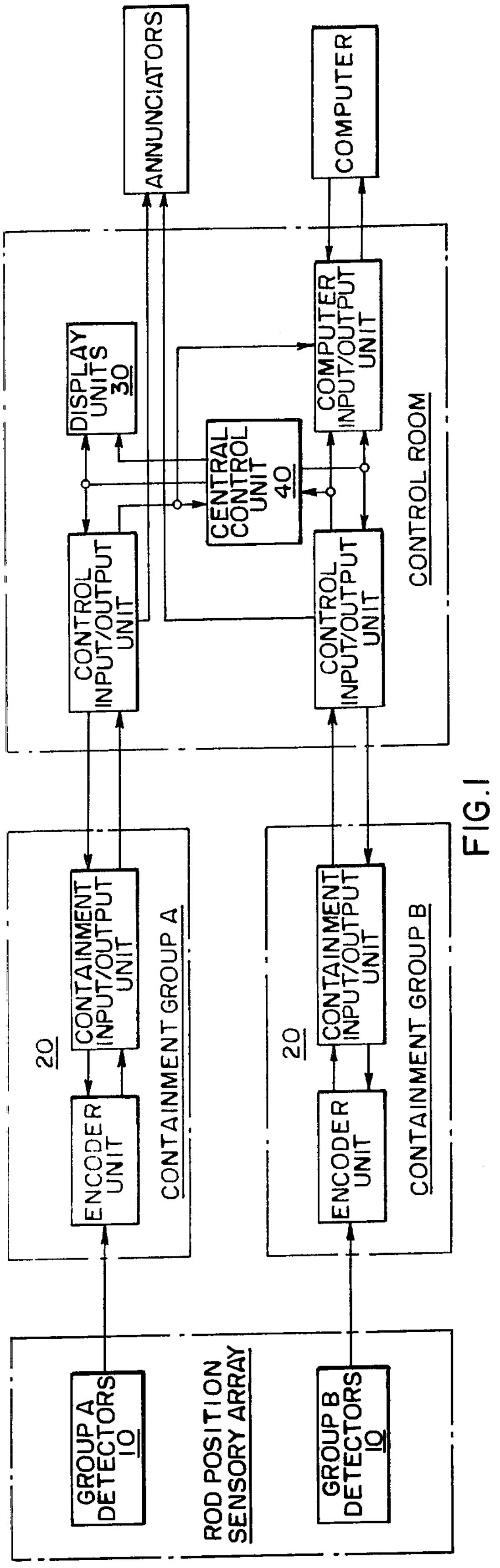
FIG. 1 is a block diagram of a position indication system incorporating the concepts of this invention.

Rod position information is available through independent and separate outputs including a local real time display using light emitting diodes for the reactor operator, and a plant computer which operates as a data logger. A block diagram of the overall rod position indication system is illustrated in FIG. 1. Redundancy is implemented within the detectors 10, containment electronics 20 and display area 30 as pictorially represented by groups A and B, respectively identifying the separate signal trains. However, the central control unit 40, used to coordinate the operation of all other areas of the system, remains the common element between otherwise redundant areas. Consequently, it represents the only weak link in the system, the overall reliability of which is primarily limited by the reliability of the central control unit itself. A failure of the central control unit will probably cause a complete loss of position information on all rods.

The operation of each of the individual blocks identified by legends in FIG. 1 can better be understood by reference to the operational explanation provided in copending application Ser. No. 320,792, cited above.

The addition of a second central control unit in a redundant arrangement with the first provides little improvement since a disagreement between the two units would prove only that one had failed but would give no indication as to which one. Due to the complexity of its functions, failure detection within each central control unit could not be reliably implemented as in the rest of the system.

An excellent alternative to failure detection and correction as provided by this invention is implemented with majority voting logic (two out of three or threshold type logic). The straightforward implementation of this concept can be provided in two ways. First, a centralized majority voting scheme can be employed as illustrated in FIG. 2 or secondly, a distributive majority voting scheme can be employed as illustrated in FIG. 3.

Figure 2:
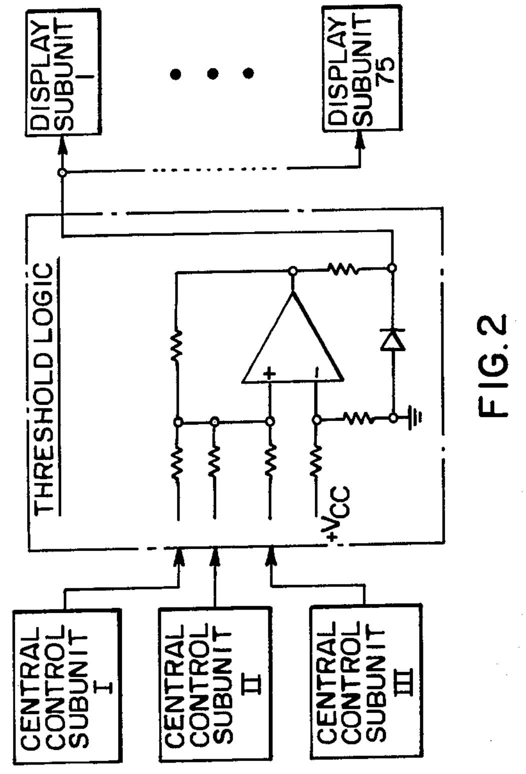
FIG. 2 is a partial schematic of one embodiment of this invention.

In the centralized majority voting arrangement of FIG. 2, three central redundant control units I, II and III are employed. The three corresponding output signals from the central control units I, II, and III are processed by a common majority voting circuit identified by the legend threshold logic. The resultant output from the majority voting circuit is distributed to the various display units corresponding to the number of control rods being monitored, identified by the legends display 1 through display 75. While, the circuit arrangement illustrated provides redundancy, it is obvious that the reliability of the system is now limited by the reliability of that common circuit (threshold logic) as it was before by the common control unit. This approach can only be implemented successfully if the reliability of the majority voting circuit is much higher than that of the control unit. Obviously, from the circuit arrangement illustrated, utilizing common electrical components, and in view of the complex nature of the functions performed by the central control unit as fully described in copending application Ser. No. 320,792, this criteria can easily be met. The desirability of this configuration is only limited by the standard of reliability required by a particular application.

Figure 3:
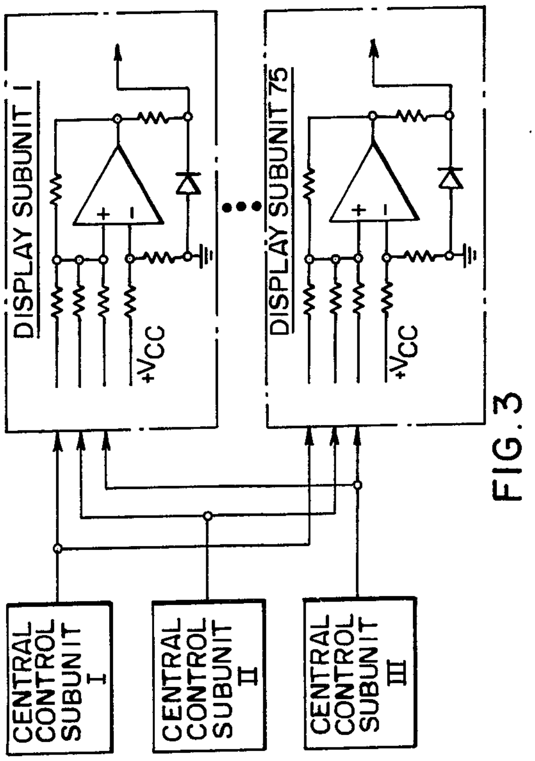
FIG. 3 is a modification to the embodiment illustrated in FIG. 2.

In the distributive majority voting circuit arrangement illustrated in FIG. 3 the outputs from the individual control units I, II, and III are distributed to the individual display units identified by the legends display 1 through display 75, where independent majority voting takes place. This approach definitely offers greater reliability at the expense of more complex wiring and a considerable amount of additional circuitry which reduces the probability of black-out type failures by increasing the probability of individual and independent failures; thus degrading the overall maintainability and serviceability of the system. The desirability of employing either embodiment will depend upon the standard of reliability required by a particular application.

Figure 4:
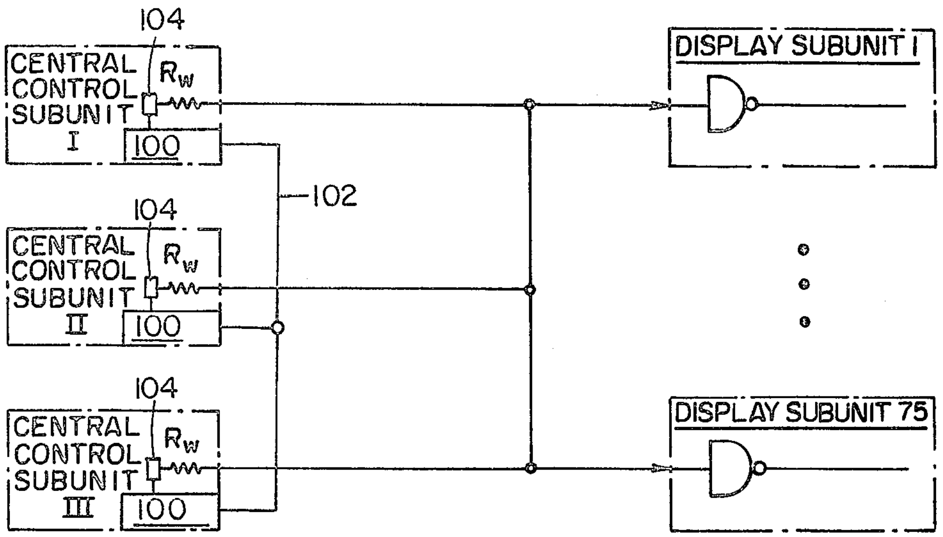
FIG. 4 is an additional modification to the embodiment illustrated in FIG. 2.

A preferred modification contemplated by this invention, which improves the reliability of the digital rod position indication system by improving the reliability of the necessarily common central control unit in the simplist possible manner, without degrading its cost, size and maintenance characteristics, is illustrated in FIG. 4.

In the system illustrated in FIG. 4, the single central control unit is replaced by three identical control units I, II and III, which control the system as fully described in copending application Ser. No. 320,792. All control units receive the same inputs from redundant sections of the system and should then respond in an identical manner unless a failure has occurred somewhere. To provide more reliable operation, the majority vote function is implemented twice at two subsequent levels by two different methods, the first digital as set forth in application Ser. No. 320,792 and the second analog (threshold logic) as described herein. Separate outputs of identical signals are provided to redundant display sections 1 through 75 so that a failure in one section cannot affect the performance of its redundant counterpart.

The digital implementation uses an identical circuit 100 within each central control unit to control connection of the respective control unit outputs to the system as described in detail in copending application Ser. No. 320,792. The first level majority vote circuit compares each output signal from its own respective central control unit with the other outputs from the other two central control units as illustratively shown by the electrical cable ties 102. If a signal differs from both corresponding signals, the majority vote circuit will conclude that the failure exists within its own unit and automatically disconnect its output from the rest of the system by controlling analog switches generally shown by block 104 connected in series with each signal output. Detection of a failure will be alarmed both locally and by the control annunciators within the reactor control room as shown in the copending application.

The analog implementation, which represents a very efficient synthesis of the two approaches shown in FIGS. 2 and 3, is accomplished by placing a resistor $R_w$ in series with each output signal before leaving the control units. Each signal is then tied to each of the other two corresponding signals before being distributed to the rest of the system as shown in FIG. 4.

Figure 5:
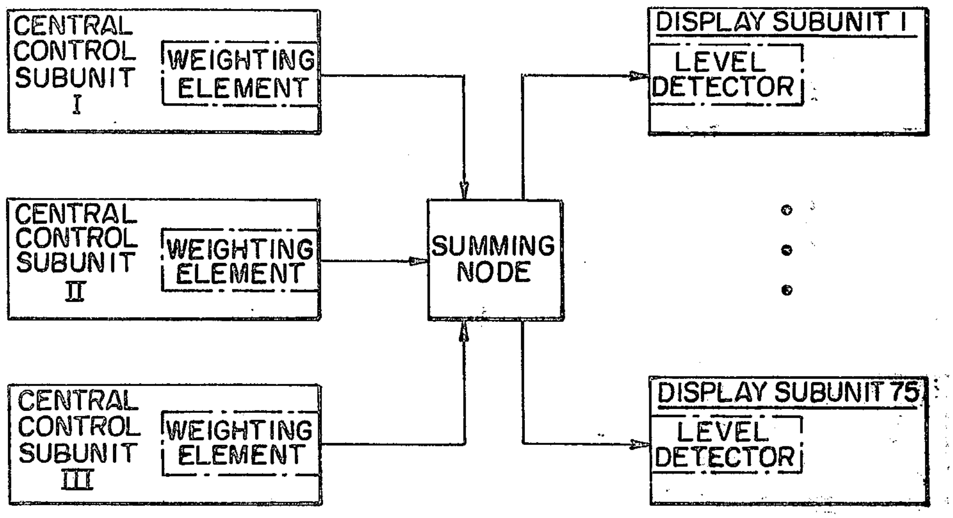
FIG. 5 is an illustrative block diagram of the modification illustrated in FIG. 4.

As a result, the three basic functions of a threshold logic majority voting circuit (weighting of the input signals, summing of the weighted signals and comparison of the summed signals against a threshold level) are shared by the various system blocks as shown in FIG. 5, which is a functional duplicate of FIG. 4. The above functions are thus accomplished in the most simple, efficient and reliable manner by respectively, the resistor $R_W$ in series with each signal output, the common bus connection of the output signals and the gate itself at the input of each display board as a result of the threshold characteristic and the high input impedance of the complementary metal oxide semiconductor logic family employed, which is specifically suitable for use in this application. The voltage of the bus will follow the state presented by the majority of signals tied together and will be determined by simple resistor voltage division. Since the NAND gates shown on the display unit have a typical threshold of one-half the power supply, the resulting threshold logic will perform the majority vote function desired. The most appealing advantage of this invention in this particular application is that it utilizes an already existing digital component (the input NAND gate as more fully illustrated in U.S. patent application Ser. No. 320,792 to perform the function usually delegated to an additional analog component such as an operational amplifier or level detector. In addition, since the NAND gates are distributed throughout the system, no single active component exists which could fail and cause all displays to be lost simultaneously. The only components actually added to the system are the weighting resistors $R_W$ which are extremely reliable and yet very inexpensive and will also provide current limiting protection against voltage transients picked up on the bus line.

Figure 6:
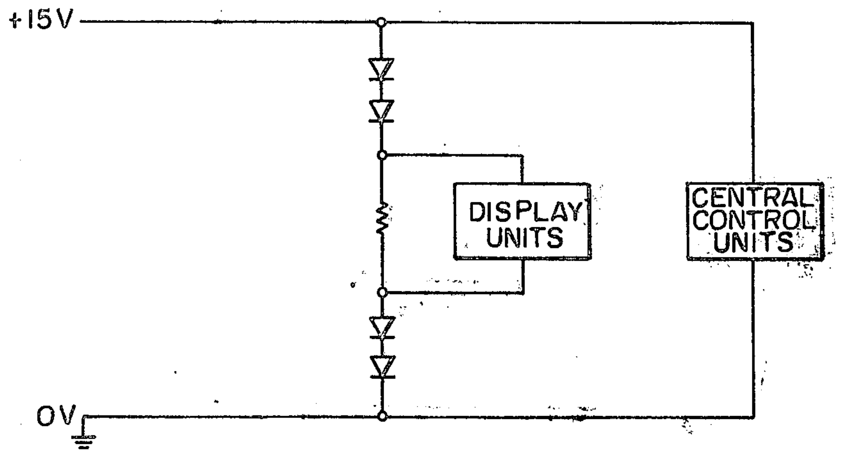
FIG. 6 is an accessorial modification to the circuits previously illustrated.

If the threshold of the digital component chosen varies excessively and a complete worst case design must be met, it is possible to compress the threshold band by using a lower supply voltage, floating between the supply voltages used by the central control unit to power the display units. For example, the display units could be powered by +13.5 volts and +1.5 volts derived from a +15 volt voltage supply and ground using four diodes and a resistor as shown in FIG. 6.

Figure 7:
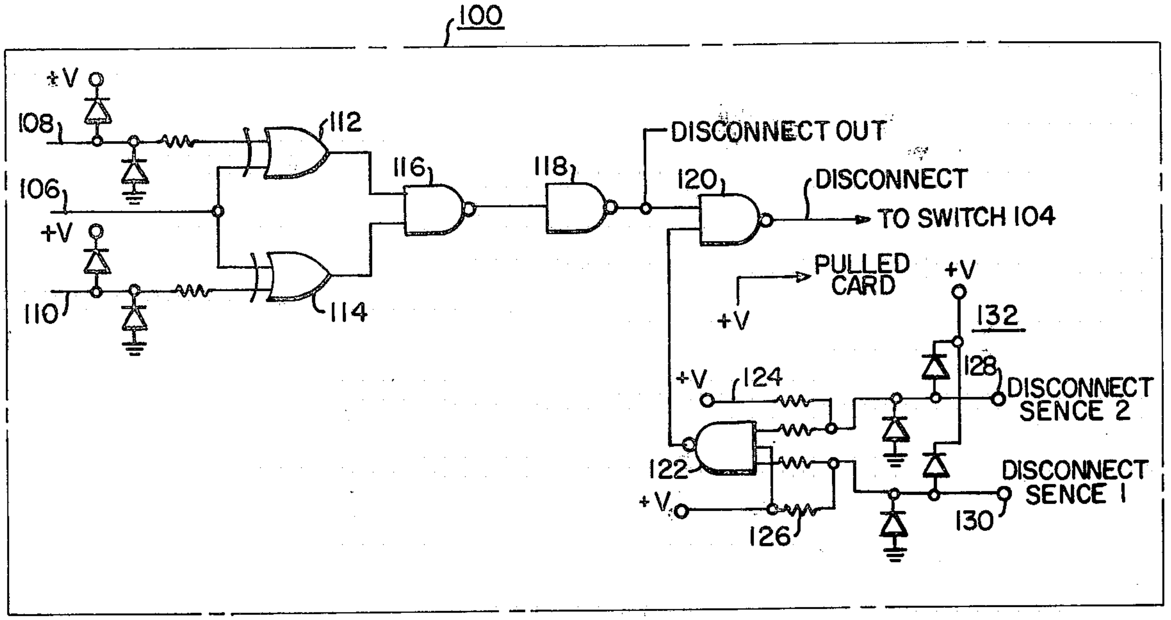
FIG. 7 is a schematic circuitry diagram of a portion of the central control subunits illustrated in FIG. 4.
Figure 8:
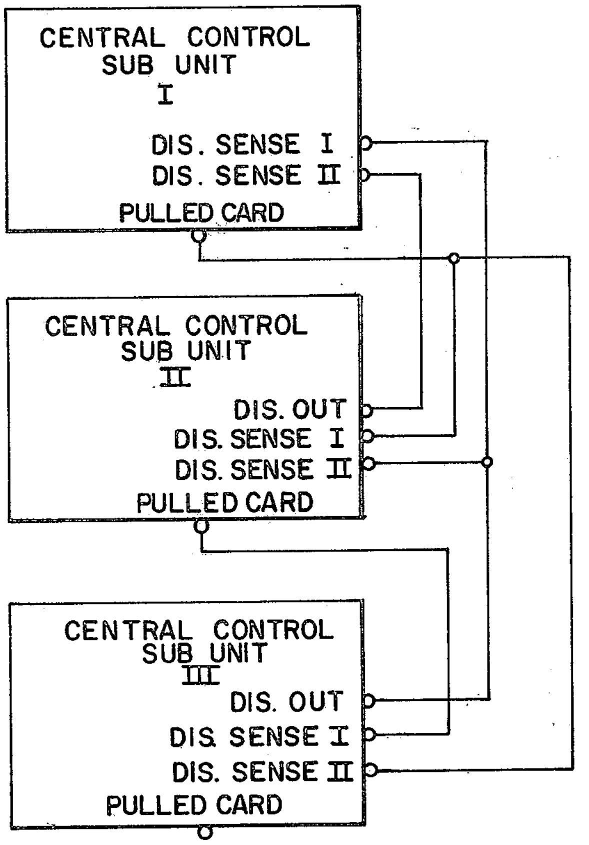
FIG. 8 is a more detailed illustration of the interconnection between control subunits illustrated in FIG. 4.

As previously described, if any signal output from the control unit disagrees with both corresponding signals from the other two control units, then this control unit is assumed to have failed and will be disconnected from the system leaving control to the remaining two control units. In the specific application to control rod position indication, as well as in many other applications, it is important that at no time should all central control units be disconnected from the system as would be the case under a multiple failure condition. Therefore, a priority is given to each central control unit to control the order of disconnection. The back wiring for such an ordered priority, graphically illustrated by the multiconductor electrical ties 102, as well as the individual elements comprising the majority vote circuit and the control unit circuit are illustrated in FIGS. 7 and 8 and described in copending application Ser. No. 320,792, entitled "Digital Multiplexed Position Indication and Transmission System" cited above. In the system illustrated, control unit I is given the highest priority such that if both of the two other control units disconnect or are removed, it will continue to control the system. If control unit I is removed, then control unit II, with the second highest priority, will refuse to disconnect if control unit III has disconnected. Finally, if both control units I and II are removed, control unit III will refuse to disconnect under any circumstance. In the circuit described, all local and remote alarms will continue to function even if a unit is prevented from disconnecting, thus identifying the fault and indicating its location.

FIG. 7 provides an example of the circuitry that can be used in block 100, illustrated in FIG. 4, for providing the first level majority vote (digital implementation) and the priority of disconnection described above. The circuits illustrated in FIG. 7 are essentially the same as those illustrated in FIG. 9 of the referenced application Ser. No. 320,792; the only difference being a simplifying assumption that the control subunits of this embodiment process a single redundant signal as compared with the multitude of signals processed by the embodiment of the referenced application. Each of the control subunits operate in the same manner and for the purposes of illustration, the operation of control subunit I will be explained in detail. The processed signal from control subunit I is communicated to terminal 106 with the processed signals from the other two units being coupled respectively to terminals 108 and 110. Control subunit I's signal is compared with the other two control unit signals by the exclusive OR gates 112 and 114, which provide a digital one output if a difference is indicated. The outputs from the exclusive OR gates 112 and 114 are then processed through NAND gates 116, which provides a zero output if, and only if, control subunit I's signal disagrees with the remaining two control subunit signals indicating a malfunction within control subunit I. The output of gate 116 is processed through NAND gate 118 to provide a disconnect output (DIS. OUT), which is monitored by the other two control subunits as illustrated in FIG. 8. The output of gate 118 is also supplied to NAND gate 120, which is inhibited from passing the output signal to the switches 104 by the circuitry 132 in the event the other two control subunits have disconnected. Accordingly, if the other two control subunits have not been disconnected and a malfunction is indicated by a disagreement monitored by the exclusive ORs 112 and 114 then a zero will appear at the disconnect output actuating the switches 104 to electrically disconnect central control subunit I from passing its output. As will be well appreciated by those skilled in the art by reference to FIGS. 7 and 8, the circuitry 132 monitors the outputs from the other two central control subunits and if an indication is sensed that both of the other two central control subunits have disconnected, a one output will be provided to NAND gate 120 inhibiting the switches 104 from actuating. Considering the order of priority previously identified, it will be appreciated that the disconnect sense 2 terminal of central control subunit I monitors the disconnect out terminal of central control subunit II as illustrated in FIG. 8 and the disconnect sense 1 terminal monitors the disconnect out of central control subunit III. Accordingly, if a one appears across both terminals 128 and 130 indicating that control subunits II and III have been disconnected, a zero will be provided to the input of gates 120 inhibiting the switches 104 from actuating. On the other hand, if a zero should appear at either terminal 128 or 130, then a one input will be communicated to gate 120 enabling control subunit I to disconnect. However, if at a later time control subunits II and III disconnect, control subunit I will resume communicating its output in accordance with the priority affixed. Furthermore, if a control subunit circuitry card is removed from the system, the corresponding disconnect sense terminal will assume a one voltage due to the pull-up resistors 126 and 124, providing an indication that the control unit has been removed. As will be appreciated by those skilled in the art, the order of priority is established by the pulled card terminals which provide a fixed voltage output approximately equal to the zero logical state. Therefore, as long as control subunit I is not removed from the system sense terminal 1 of control subunit II and sense terminal 2 of control subunit III will indicate that control subunit I is still in operation even though analog switches 102 have activated and electrical disconnection has occurred. Therefore, control subunits II and III will disconnect from the system so long as the central control subunit circuitry card for subunit I has not been physically removed. If control subunit I's circuitry card is physically removed, a reordering of priorities will occur giving control subunit II the next highest priority due to the interconnection of its pulled card terminal with the disconnect sense terminal of control subunit III. Thus, the first level majority vote is obtained with an order of priorities established that control the electrical disconnection of the control subunit outputs.

Accordingly, a totally redundant digital rod position indication system employing redundant signals which are handled by separate sections utilizing automatic detection of most failures is described. The two groups of signals are processed by a central control unit to obtain, under most conditions, full resolution, redundant readouts. The invention describes the use of three separate control units where each digital output signal from each unit is compared with the corresponding outputs from the other two units and if the local signal exhibits a difference from both other corresponding signals, a majority condition is established for that unit whereby its outputs are disconnected (first level majority vote). A second level majority vote takes place on each input of the receiving readout units by comparing the weighted sum voltage of the corresponding outputs (from the three central control units) applied to a common bus against the logic threshold voltage of each input. By distributing the implementation of the majority vote threshold logic among three different sections of the system more reliable operation is obtained without degrading the systems maintainability. The applicability of the majority vote concept contemplated by this invention to a wide range of redundant systems utilizing similar inputs is evident. The advantages obtained in expanding the redundancy of such systems as well as in providing a method of local fault detection enhances the reliability and instills greater confidence in the validity of the information conveyed.

We claim as our invention:

1. A circuit arrangement for enhancing the reliability of common bus outputs in redundant systems generating a plurality of at least three substantially similar outputs to a common bus signal train comprising:

means for comparing the plurality of output signals and responsive to a difference in the outputs to disconnect the respective output signals exhibiting the difference from the common bus and pass the remaining outputs to the common bus, and means responsive to a difference in more than one of the outputs to control the comparing means to disconnect the outputs exhibiting the difference from the common bus in a predetermined order of priority.

2. The circuit of claim 1 wherein when all the outputs exhibit a difference said means for controlling the comparing means prevents said comparing means from disconnecting from the common bus the last output to be disconnected in accordance with the predetermined order of priority.

3. The circuit of claim 1 wherein said means for comparing the plurality of outputs includes a plurality of comparators corresponding to and individually associated with the plurality of outputs, each of said comparators being operable to compare its corresponding output with all other outputs and disconnect its corresponding output from the common bus if a difference is exhibited thereby with respect to the remaining outputs.

4. The circuit of claim 1 wherein the plurality of outputs are weighted before being distributed to the common bus, including a plurality of output circuits connected in parallel to the common bus with each of said output circuits including a threshold logic circuit responsive to the common bus input to pass the majority vote of the output signals distributed to the common bus.

5. An improved digital position indication system for displaying the relative position of a movable element with respect to fixed known coordinates including a sensor responsive to the element's position to provide discrete electrical outputs indicative thereof; an encoder electrically coupled to said sensor and operable upon said discrete outputs to provide a digital coded output representation of the element's position; an interface electrically communicating with said encoder and operable upon said digital coded output to transmit said digital coded output upon a corresponding command address signal; a plurality of at least three redundant control systems electrically communicating with said interface for generating, sequencing and transmitting said corresponding command address signal to said interface system to effect transmission and accommodate reception of said digital coded output, each of said plurality of control systems being operable upon said digital coded output to separately provide a redundant decoded display signal output indicative of the element's position to a common bus line; and a display responsive to the display output signal provided on said common bus line to provide a visual display of the element's position, wherein the improvement comprises:

means for comparing said redundant decoded display signal outputs and responsive to a difference in the display outputs to disconnect the respective output signals exhibiting the difference from the common bus and pass the remaining outputs to the common bus; and means responsive to a difference in more than one of the outputs to control the comparing means to disconnect the display outputs exhibiting the difference from the common bus in a predetermined order of priority.

6. The position indication system of claim 5 wherein when all the display outputs exhibit a difference said means for controlling the comparing means prevents said comparing means from disconnecting from the common bus the last output to be disconnected in accordance with the predetermined order of priority.

7. The position indication system of claim 5 wherein said means for comparing said display outputs includes a plurality of comparators corresponding to and individually associated with said plurality of control systems, each of said comparators being operable to compare its corresponding display output with all other display outputs and disconnect its corresponding display output from the common bus if a difference is exhibited thereby with respect to the remaining display outputs.

8. The position indication system of claim 5 wherein said common bus output is connected to a threshold logic majority vote circuit having an output consistent with the majority of said display output signals which are communicated to said display.

* * * * *